(12) United States Patent
Lin

(10) Patent No.: US 8,631,081 B2
(45) Date of Patent: Jan. 14, 2014

(54) SYSTEM AND METHOD FOR INFORMATION RISK MANAGEMENT

(76) Inventor: Yeejang James Lin, San Jose, CA (US)

( * ) Notice: Subject to any disclaimer, the term of this patent is extended or adjusted under 35 U.S.C. 154(b) by 0 days.

(21) Appl. No.: 12/497,981

(22) Filed: Jul. 6, 2009

(65) Prior Publication Data

US 2010/0121929 A1    May 13, 2010

Related U.S. Application Data

(60) Provisional application No. 61/113,730, filed on Nov. 12, 2008.

(51) Int. Cl.
*G06F 15/16* (2006.01)

(52) U.S. Cl.
USPC .......... 709/206; 709/217; 709/223; 709/224; 709/226; 713/164; 713/166

(58) Field of Classification Search
USPC .......... 709/206, 217, 223, 224, 226; 713/164, 713/166
See application file for complete search history.

(56) References Cited

U.S. PATENT DOCUMENTS

| | | | |
|---|---|---|---|
| 2002/0198750 A1* | 12/2002 | Innes et al. ................ | 705/7 |
| 2004/0015375 A1* | 1/2004 | Cogliandro ................ | 705/7 |
| 2004/0054563 A1* | 3/2004 | Douglas ................... | 705/7 |
| 2005/0192963 A1* | 9/2005 | Tschiegg et al. .......... | 707/9 |
| 2007/0106599 A1* | 5/2007 | Hochberg et al. ......... | 705/38 |
| 2008/0288301 A1* | 11/2008 | Emling et al. ............. | 705/4 |
| 2009/0119740 A1* | 5/2009 | Alperovitch et al. ...... | 726/1 |
| 2009/0248465 A1* | 10/2009 | Recce et al. .............. | 705/7 |
| 2009/0319420 A1* | 12/2009 | Sanchez et al. ........... | 705/38 |

OTHER PUBLICATIONS

Office Action of corresponding TW application, published on Jan. 14, 2013.

* cited by examiner

*Primary Examiner* — Phuoc Nguyen
*Assistant Examiner* — Clarence John
(74) *Attorney, Agent, or Firm* — Wang Law Firm, Inc.; Li K. Wang; Stephen Hsu

(57) ABSTRACT

The present invention provides a system and method for evaluating risk associated with information access requests. The information access requests are collected, assigned a risk level according to user defined policies, a total risk is calculated and presented to user. The user can select a high risk event for further analysis. The system will break down the event into basic elements, so the user can ascertain the risk. The system allows a user to customize a report and the customized report can be saved as a template for future use.

16 Claims, 7 Drawing Sheets

SYSTEM AND METHOD FOR INFORMATION RISK MANAGEMENT

RELATED APPLICATION

This application claims benefits of the U.S. Provisional Application for Method For Information Risk Management, U.S. Provisional Pat. App. No. 61/113,730, filed on Nov. 12, 2008, the specification of which is included in its entirety by this reference.

BACKGROUND OF THE INVENTION

1. Field of the Invention

The present invention generally relates to data security, and more specifically, relates to a system and method that manages risk related to data access.

2. Description of the Related Art

Information equals to power and having access to the right information equals having a competitive advantage over others in today's world. Each company closely guards the information essential to their business. Traditionally, the access to sensitive information of each company is restricted to a small number of authorized personnel. This access control scheme is simple and easy to implement; however, it is static and not flexible to adapt to changing needs.

If a user is deemed high risk, then his access to the system is limited. If the user is deemed safe, then his access right to the system is broad. The rights assigned to the user do not tend to change. Once accesses are granted, the risks of these accesses are not evaluated and often there is no real time auditing of data access in the system. Therefore, a malicious privileged user may abuse his access rights without being noticed until some major failure happens or a disaster is created.

Therefore, there is a need for a system that evaluates and monitors risks associated with different accesses and it is to this system the present invention is primarily directed to.

SUMMARY OF THE INVENTION

In one embodiment, the present invention provides a method for calculating a total risk of an information access request in a system. The method includes setting a spatial risk model with a plurality of axis, each axis representing a type of risk, receiving by an access request monitoring unit an information access request, determining a risk of the information access request to a database for each of the plurality of axis according to a user defined policy for each of the plurality of axis, and calculating a total risk by determining a distance of a point representing the total risk from a center of the plurality of axis.

In another embodiment, there is also provided a method for managing risk associated with information access in a system. The method includes calculating a plurality of risks associated with an information access request by applying policies retrieved from a policy storage unit, storing the information access request into a storage unit, calculating at a controller a total risk for the information access request based on the plurality of risks, creating an event by associating the total risk with the information access request, selecting a plurality of events using a plurality of filtering criteria, presenting the selected plurality of events as a report on a display screen, and creating a template that records the plurality of filtering criteria.

In yet another embodiment, there is provided an apparatus for managing risk associated with information access in a system. The apparatus includes an access request monitoring unit for receiving information access requests, a policy storage unit for storing policies for information access requests, and a controller for calculating risks associated with the information access requests by applying the policies to the information access requests and for generating reports based on templates, the controller further being capable of creating templates according to filtering criteria.

In yet another embodiment, there is provided a method for presenting a predefined report related to risk associated with information access requests in a system. The method includes receiving a plurality of information access requests from an access request monitoring unit, associating each information access request with a risk according to a plurality of risk policies retrieved from a policy storage unit, receiving a report selection from a user interface, adjusting filtering criteria associated with the selected report, retrieving information access requests according to the selected report, and presenting the selected report along with the retrieved information access requests.

The present system and methods are therefore advantageous as they enable identification of abnormal information access behaviors. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which.

DETAIL DESCRIPTION OF THE INVENTION

In this description, the term "application" as used herein is intended to encompass executable and non-executable software files, raw data, aggregated data, patches, and other code segments. The term "exemplary" is meant only as an example, and does not indicate any preference for the embodiment or elements described. Further, like numerals refer to like elements throughout the several views, and the articles "a" and "the" includes plural references, unless otherwise specified in the description. The terms "baseline," "baseline information," "baseline database," and "historical behavior information" are used interchangeably.

In an overview, the present invention provides a system and method managing risk related to data access. The system of the present invention presents a model for information risk management. The information regarding data access in a system is collected and analyzed according to a set of risk policies and different levels of risk. The result of the analysis is presented to a system administrator and the result can be presented differently depending on selection criteria selected.

Figure 1:
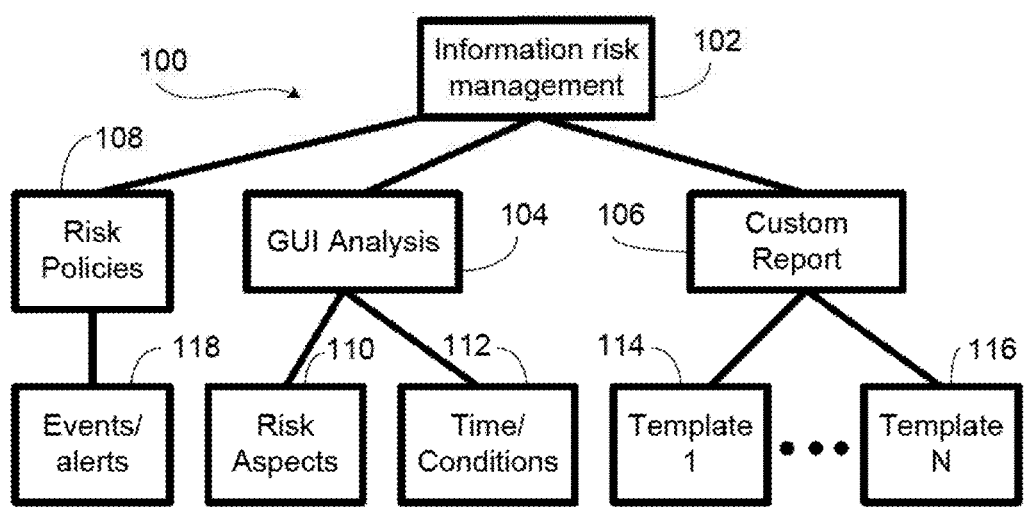
FIG. 1 depicts a model for information risk management.

FIG. 1 illustrates a model 100 for information risk management 102 for a system. The information risk management 102 has components: analysis 104, report 106, and risk policies 108. The analysis 104 refers to analysis of data access information in the system. The data access information can be collected based on different risk policies 108, different risk aspects 110, and different time and conditions 112. The application of the risk policies 108 may be triggered by events or alerts 118 that happen within the system. After the risks are analyzed, they are presented to system administrator. The presentation is tailored to the report selected by the system administrator. Different templates 114, 116 can be set up ahead of the time and available to the system administrator. The system according to the information risk management 102 will enable creation of new templates by memorizing risk analysis done by the system administrator. The new templates can then be used for future customer reports.

Figure 2:
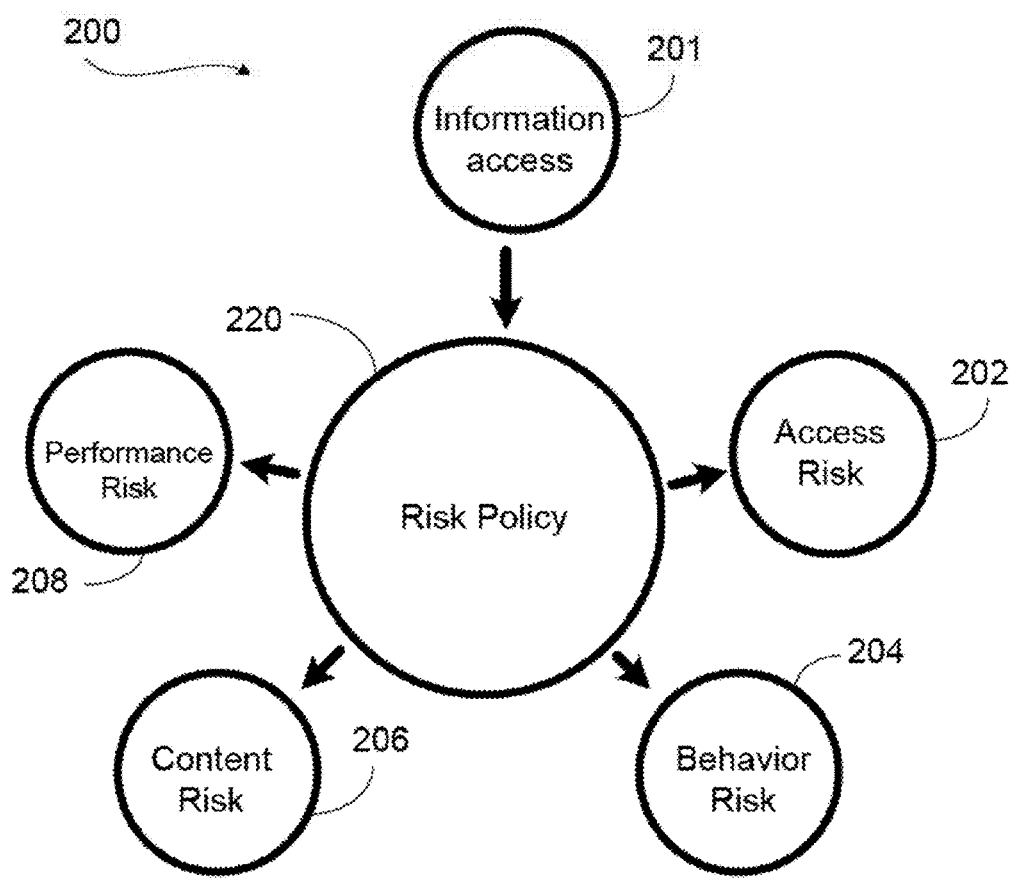
FIG. 2 depicts a model of risk policies.

FIG. 2 depicts a model 200 of risk policies 108. The risk policies 220 are usually defined by system administrator and apply to the information access requests 201. The risk policies 220 will then trigger events and alerts with assigned risk levels. The risks may be classified into access risk 202, behavior risk 204, content risk 206, and performance risk 208. Each risk is defined by a user defined policy. Certain content may be sensitive, for example a credit card database and the content risk 206 associated with this content may have a higher risk. The content policy may also contain entry for key word search or phrases. The key word search may be a regular expression used to search for certain sensitive data or information in file or in a file transfer.

The access risk 202 relates to risk governed by user defined policy. For example, the system administrator can set a risk level for certain file or user behavior related to user access. A user access can be defined by five elements: who, how, what, where, and when. A detail description of user access defined by these five elements is included in the U.S. patent application Ser. No. 12/431,946, filed on Apr. 29, 2009, for "System And Method For Detecting Behavior Anomaly In Information Access," which specification is incorporated herein by this reference. A risk level is assigned for each information access with a matching policy and an action is also assigned to record an audited event or trigger an alert.

The behavior risk 204 relates to risk governed by user profile, object profile, method profile, location profile, and time profile. When a user behaves differently from his user profile, the behavior risk level should be raised. Similarly, when a data object is being accessed in some usual time, by someone who does not access it regularly, or through a method that is not normally used, the risk level should also be raised. The behavior risk 204 employs the concept of elements, members, and groups defined in the anomaly detection patent application. The behavior risk 204 is associated with a behavior profile, which is associated for each member of each member group, and the behavior profile is defined in terms of associations between elements. The associations are tracked by bitmaps and counters and each counter has a set of thresholds and is also assigned a risk level if the threshold value is reached. When a tracking counter reaches its threshold, an alert is issued and the system administrator can then take some action.

The performance risk 208 relates to response time and is governed by profiles. Each information access response time is set and examples of information access response time include server process time and network transmission time. For each response time a threshold is set. For each transaction a transaction time and corresponding threshold may also be set. For each connection a connection time and threshold are similarly set. Under the performance risk, certain data access may take X microseconds, and the risk level should be raised if the access time is higher than X microseconds or a limit that has been defined by a profile associated with that data.

Figure 3:
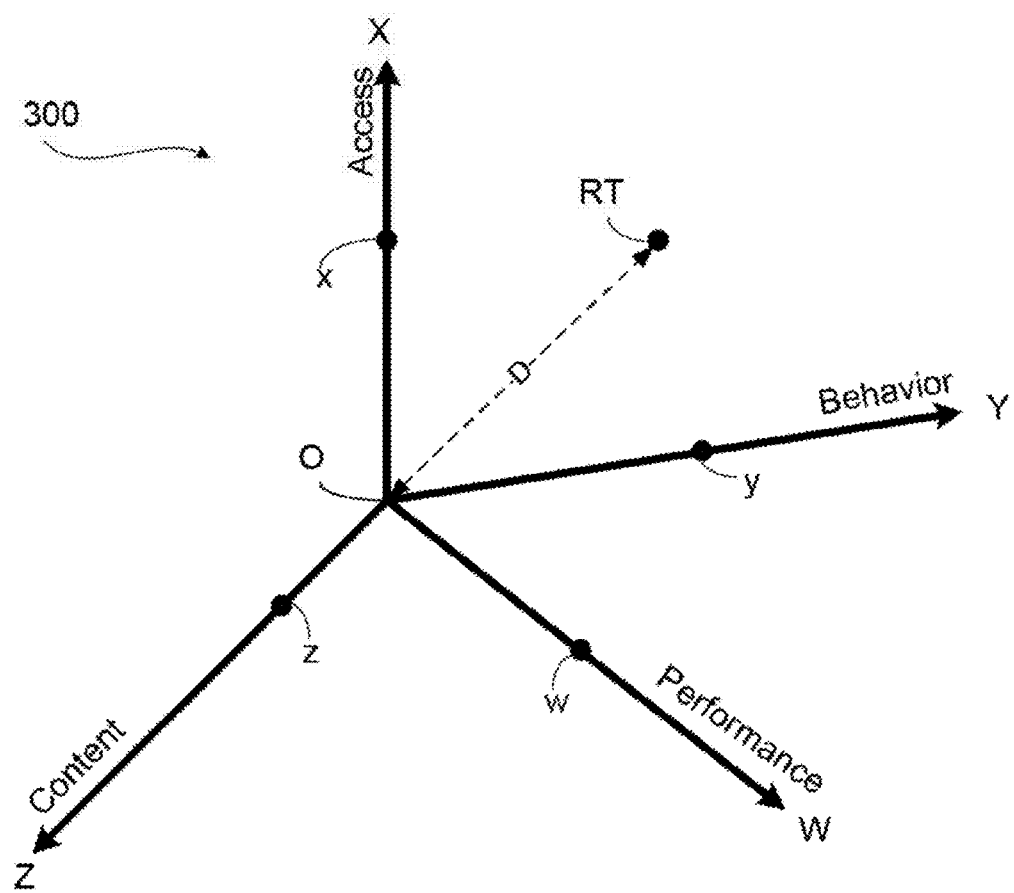
FIG. 3 depicts a system for representing risks.

Four different types of risk are presented above: access risk, behavior risk, content risk, and performance risk. For each risk a risk level may be assigned. Because of different types of risk involved, a new risk presentation is developed for interpretation of the total risk. FIG. 3 represents a system for representing risks associated with an information access request. Four axes are represented in this system, one axis for each risk type. The risk assigned for each risk type is represented on a corresponding axis. If $R_A=F(A)$ represents the access risk, $R_B=F(B)$ represents the behavior risk, $R_P=F(P)$ represents the performance risk, and $R_C=F(C)$ represents the content risk, then the total risk (or combined risk) can be defined as $R_T=F(R_A, R_B, R_P, R_C)$. The risk level of each type can be represented by a risk distance that is defined as the point in an axis representing the risk level from the origin O. Spatially, the total risk associated with an information access request can also be represented by the distance D from a point $R_T$ representing the combination of risks in FIG. 3 to the origin O. An example of a function F for $R_T$ may be $R_T=$sqr $(x^2+y^2+w^2+z^2)$, a square root function, where x represents risk $R_A$, y represents risk $R_B$, w represents risk $R_P$, z represents risk $R_C$, and sqr represents square root function. Alternatively, the total risk may also be calculated according to the following equation; $R_T=$sqr$((a^2x^2+b^2y^2+c^2w^2+d^2z^2)/(a^2+b^2+c^2+d^2))$, where a, b, c, and d are weighted values for x, y, z, and w.

Figure 4:
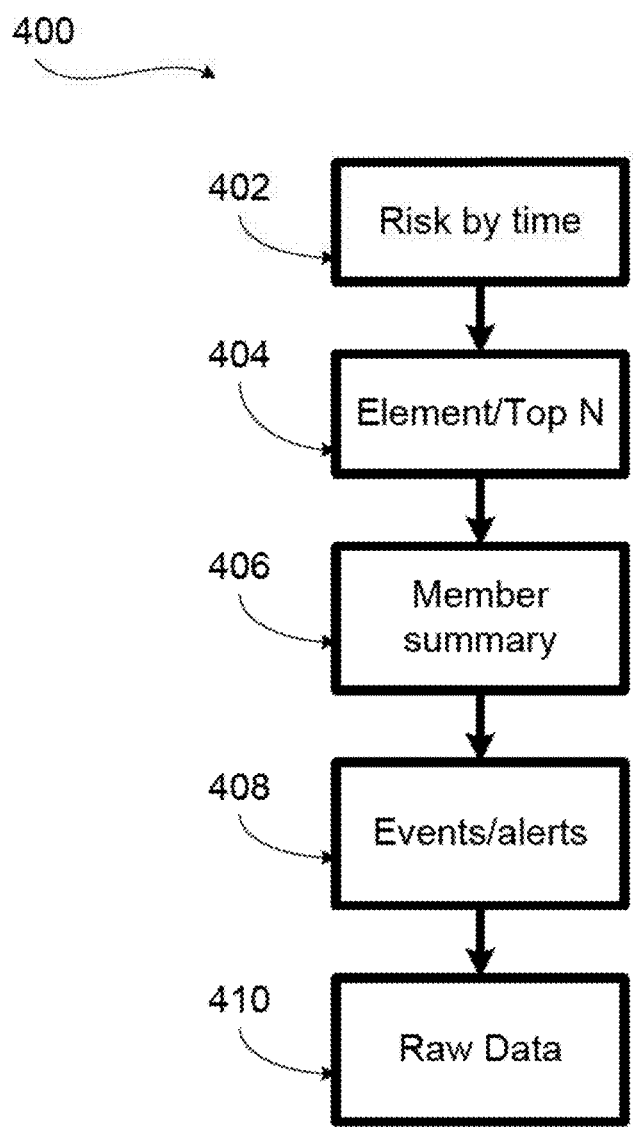
FIG. 4 illustrates a model for analyzing risks.

The present invention allows a user to have a clear overview of the system according to different risks in the system and enables the user to create templates that enable the user to re-create any analysis of different risks done previously. Each information access is recorded and assessed in term of risk involved according to predefined risks of matching policies; the information access with assigned risk from matching policy is an event and an event with urgency (also definable by administrator) is an alert. All events and alerts are collected and pre-processed for later analysis. FIG. 4 illustrates a simple model 400 for analyzing risks. The information collected is first presented in a timeline fashion, i.e., the events are listed in the order as they happen, step 402. From this listing, the system can apply filters to select elements associated with these events, step 404. For example, the system can use a filter to select an element most associated with these events. Assuming now that the element selected being a database ("what" element), the system can further filter the information from the events to select most accessed files (members in the "what" element), step 406, and present the result on a GUI. If the system administrator is interested to learn more about these events, he can use additional filters to review the actual recorded events, step 408. Finally, the system will also allow the system administrator to review the data (raw data) associated with the actual transactions behind these recorded events, step 410. The system described above will allow a system administrator to have an overview of the risks associated with information access in the system and also allow the system administrator to review any event or transaction associated with a high risk.

Figure 5:
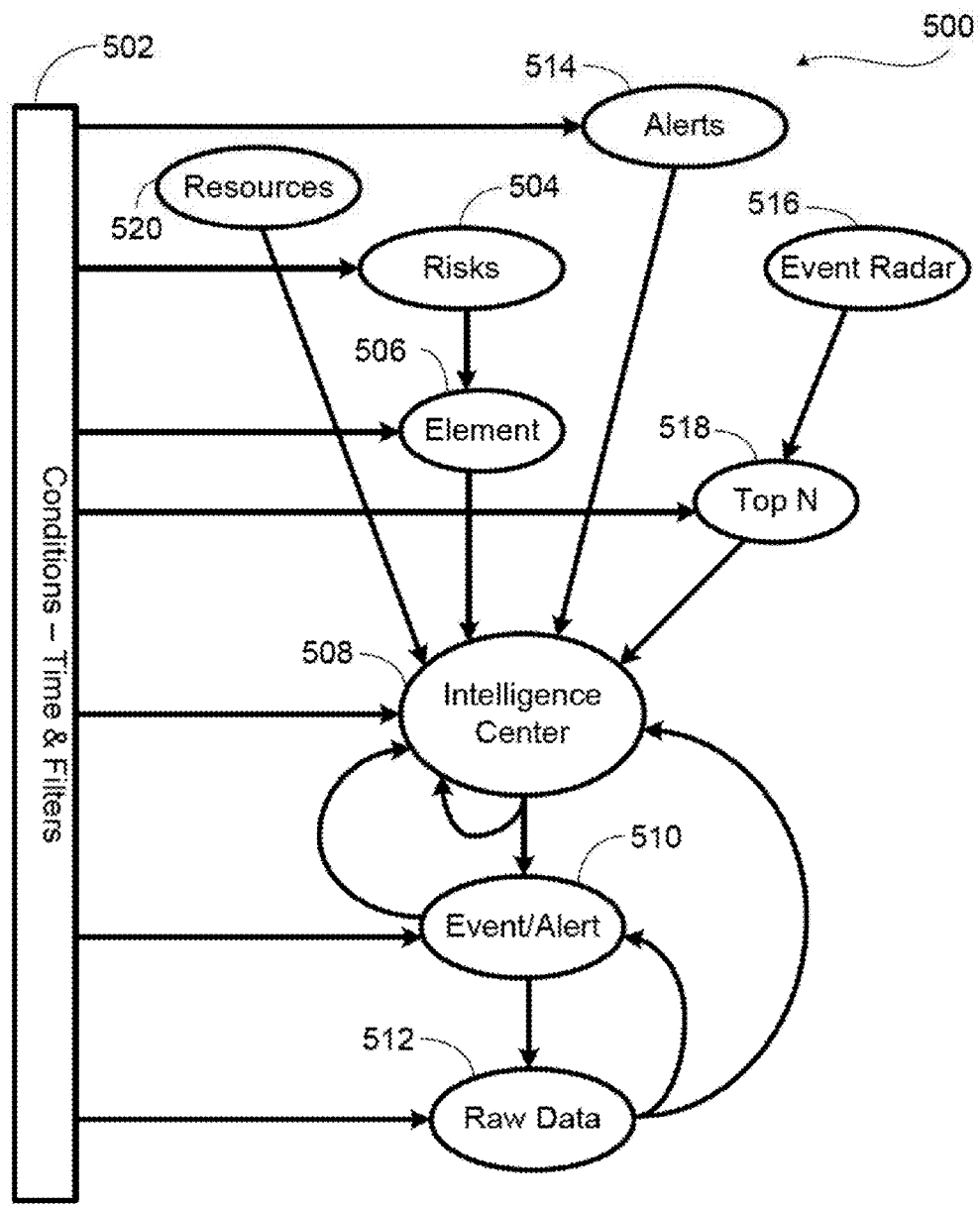
FIG. 5 is architecture of a system according to one embodiment of the invention.

FIG. 5 is architecture 500 of a system according to one embodiment of the invention. As described above, all information accesses are recorded by the system and associated with a risk. The recorded information can be filtered based on specific time or filtering conditions 502 and these time and filtering conditions 502 can be used to further process risk level information 504 and alerts 514. The risk level information 504 is triggered by policy and can be filtered to produce the element level 506. Every risk level information 504 can be decomposed into the element level 506. The information and its associations (aka member summary) from the element level 506 can be further analyzed and manipulated at the intelligence Center 508. If the system administrator so wishes, the intelligence center 508 can present actual event information 510 recorded by the system, and the intelligence center 510 can also provide actual transaction data (raw data) 512 detected and recorded for analysis.

The conditions 502 may be used to further select and process access information, according to time and filters, real time alerts 514, information from event radar 516, risk level information 504, element level information 506, and top events 518. The conditions 502 may also be used by Intelligence Center 508 to further access archived event/alert 510, and raw data 512. The real-time alerts 514 may be seen as events with urgency and can be presented directly to the intelligence center 508 for immediate handling. The alerts 514 are caused by transactions of high risk or related to transactions selected by user defined criteria. The alerts 514 involve either immediate notification or action. The alerts 514 are usually delivered immediately to system administrator and delivery may be through email, short message service (SMS), or audio message. The alerts 514 may be further classified into high, medium, and low priorities. The event radar 516 is a subsystem that detects all events and displays them to a system administrator. Since the number of events may be very large, what the system administrator sees may be several pockets of concentration of events and the system can present any number of top events 518 through proper filtering. Resources 520 refer to elements "who," "what," and "how" and their members, specifically the resources 520 may include different databases, different users, and different commands. The resource 520 may be used by the intelligence center 508 to process and interpret events and alerts.

Figure 6:
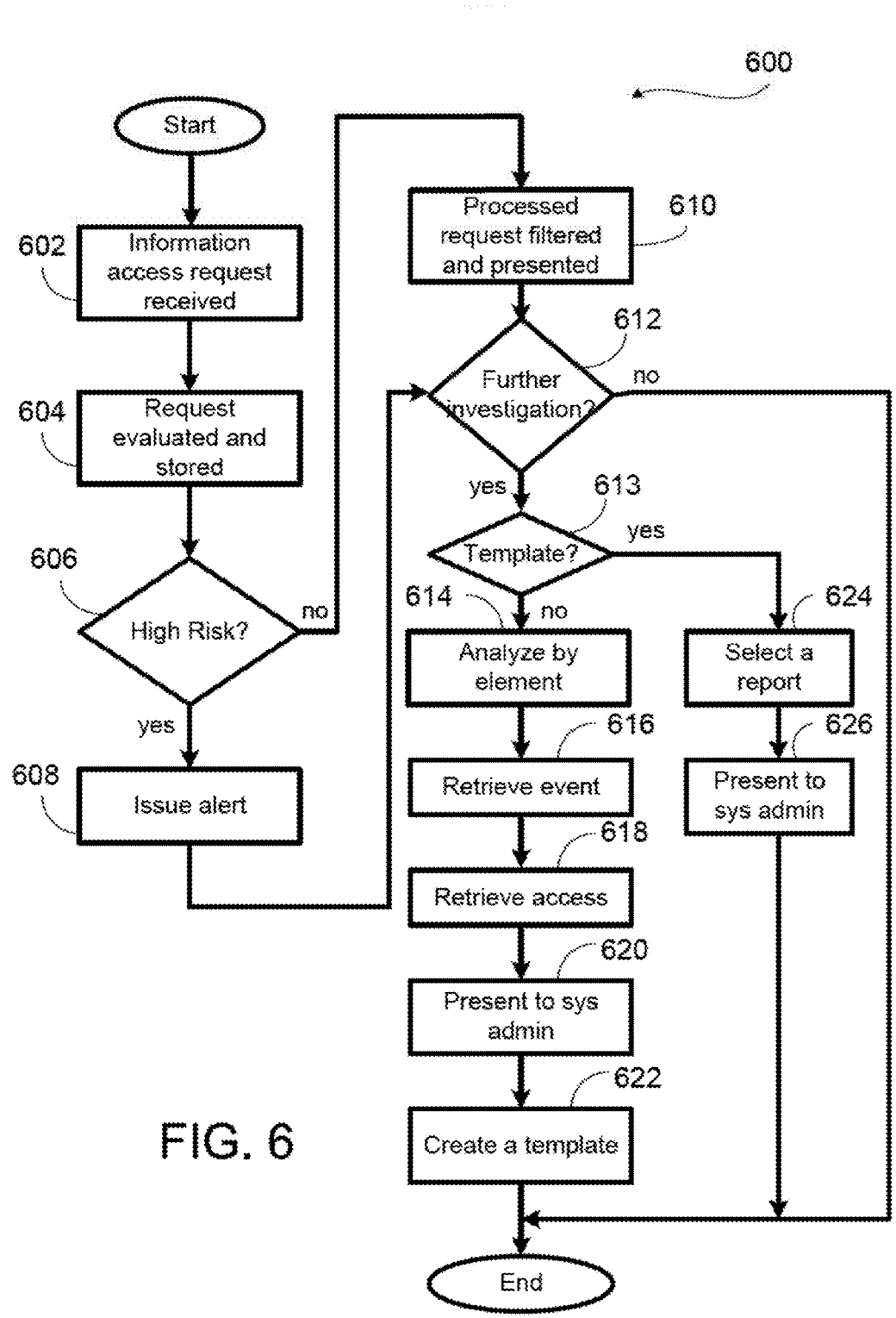
FIG. 6 is a flow chart of operations of a system according to one embodiment of the invention.

In operation, a system according to the invention will do live monitoring of information access requests. The system monitors information access to different databases by collecting information related to these accesses, analyzing them, and allowing them to be presented differently to system administrator. The access related information is observed at their access points and forwarded to the system for analysis. The monitoring is not restricted to the access request, but also to the content accessed. The number of accesses, volume of records accessed, and the rate these accesses are collected and analyzed. FIG. 6 is a flow chart 600 of operations according to one embodiment of the invention. Information access is observed, step 602, and stored, step 604. Every information access is audited and evaluated. Each access is assigned a risk level according to user policies defined for the accessed object, accessed method, accessed subject, accessed time, or accessed location. Each access may be associated with several risks and a total risk is calculated for each access. All information access are recorded and stored. If an information access is classified as high risk, step 606, the system may issue an alert, step 608. Otherwise, this information access may be recorded and preprocessed as an event for system administrator to easily filter, analyze, and associate, step 610, along with all other information accesses.

Both alerts and regular events will be presented to the system administrator and the system administrator has the option to further investigate any alert or event, step 612. When the system administrator chooses to analyze an alert or event, he has the option to view the alert/event through a report generated by an existing template, step 613. If the system administrator decides to use a template, he can select a report, step 624, from a plurality of predefined reports. The system will then process the information related to access requests and present it as a report to the system administrator, step 626. If there is no adequate predefined report or template, the system administrator can select an existing report and then customize the analysis by adjusting the filtering criteria. The analysis may be done by element, step 614, so that different risks associated with the alert or event can be dissected. For example, if the system indicates that there is an abnormal risk associated with a human resource database, the analysis may reveal users who may be accessing this database or causing this higher level of risk. In another example, the system may detect an abnormal access rate to a particular database, e.g., the number of accesses exceeds a predefined threshold number, the system will reveal the identity of user accessing such database and the nature of access. If there is a high rate of access failures from a particular access port, the system will also identify the access port and the nature of access failures. The system may be able to retrieve the events associated with these high risk accesses, step 616, or retrieve the actual access request related information, step 618, and present to the system administrator, step 620. After this customized analysis is done and information presented to the system administrator, the system administrator can then create a template with all the recorded selection criteria, step 622. This template will be available to the administrator to generate customized reports.

The creation of templates is an important feature of the present invention. The template records all the filtering criteria made by a user and thus allowing a customized report be generated quickly in the future. The filtering criteria associated with each template can be adjusted. For example, when a user selects to view events through a report generated by a specific template, the user can further modify the report by adjusting the filtering criteria. The resulting report can be used as a basis for creating of a new template.

Figure 7:
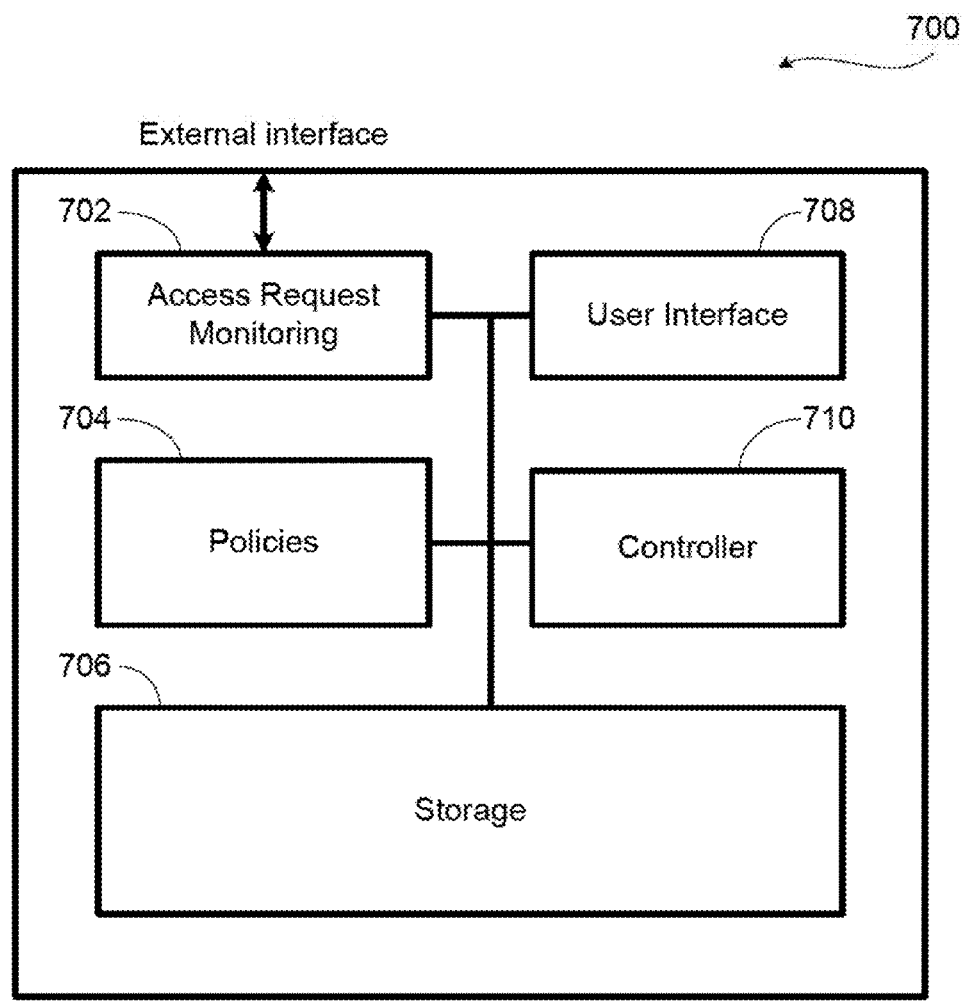
FIG. 7 is architecture of a system according to one embodiment of the invention.

The method of the present invention can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a networking computer platform, such as a magnetic disk or tape, optical disk, hard disk, flash memory, or other storage media as is known in the art. A system 700 supporting such method is shown in FIG. 7.

The system 700 includes an access request monitoring unit 702, a policy storage unit 704, a user interface unit 708, a controller 710, and a storage unit 706. The access request monitoring unit 702 monitors traffic of access requests in one or more databases residing in one or more systems and receives these access requests. The access requests are duplicated and sent to the access request monitoring unit 702. The access requests are stored in the storage unit 706 and also processed by the controller 710 according to the policies stored in the policy storage unit 704. The storage unit 704 may also store templates that will be used for generation of predefined reports. A total risk can be calculated for any access request by combining risks obtained by applying different policies. It is understood that the policy storage unit 704 may be combined with the storage unit 706 and separate policies may be stored in separated policy storage units 704. The processed access requests are presented to the system administrator through the user interface unit 708. A user may also select what report to see by inputting a selection through the user interface unit 708. The selected report will be generated with help of a corresponding template. The user may also change filtering criteria through the user interface 708. The controller 710 may perform all the functions described above for the intelligence center 508. The system administrator may command the system 700 to perform analysis through a display unit (not shown) connected to the user interface unit 708.

In the context of FIGS. 4, 5, and 6, the steps illustrated do not require or imply any particular order of actions. The actions may be executed in sequence or in parallel. The method may be implemented, for example, by operating portion(s) of a network device, such as a network router or network server, to execute a sequence of machine-readable instructions. The instructions can reside in various types of signal-bearing or data storage primary, secondary, or tertiary media. The media may comprise, for example, RAM (not shown) accessible by, or residing within, the components of the network device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media. The instructions when executed by a computer will enable the computer to perform the steps illustrated in FIGS. 4, 5, and 6.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated. The combinations of different features described separately in this specification are foreseeable and within the scope of the invention.

What is claimed is:

1. A method for managing risk associated with a plurality of information accesses to a database from a plurality of users in a system, comprising the steps of:
    calculating a plurality of risks associated with each information access request to the database from a user by applying policies retrieved from a policy storage unit;
    storing each information access request from the user into a storage unit;
    calculating at a controller a total risk for each information access request based on the plurality of risks;
    creating a first plurality of events by associating each information access with the total risk calculated for that information access request;
    selecting a second plurality of events from the first plurality of events using a plurality of filtering criteria;
    presenting the second plurality of events as a report on a display screen;
    creating a template that records the plurality of filtering criteria for selecting the second plurality of events, each event in the second plurality of events being associated with one information access, the template being used in future customer reports; and
    storing the template in the storage unit,
    wherein
        the plurality of risks comprises behavior risk and performance risk, the behavior risk is assessed by comparing a detected behavior of a user against a behavior profile for the user, the user accessing an allowed information at a time that is outside of the behavior profile for the user will raise a level of the behavior risk, and the performance risk is assessed by comparing a detected transaction time for an information access against a threshold.

2. The method of claim 1, further comprising receiving the plurality of information access requests from an access request monitoring unit.

3. The method of claim 1, further comprising creating an alert if the total risk associated with each information access request is above a threshold level.

4. The method of claim 3, further comprising delivering the alert to a system administrator.

5. The method of claim 4, wherein the alert being delivered by email.

6. The method of claim 4, wherein the alert being delivered by SMS.

7. The method of claim 1, wherein the event is presented in a timeline fashion.

8. The method of claim 1, wherein the plurality of risk further comprises access risk and content risk.

9. The method of claim 1, further comprising the step of receiving the plurality of filtering criteria from a user interface.

10. An apparatus for managing risk associated with information access in a system, comprising:
    an access request monitoring unit for receiving information access requests for accessing a database;
    a policy storage unit for storing policies for information access requests;
    a storage unit for storing the information access requests; and
    a controller for calculating risks associated with each information access request by applying the policies to each information access request and for generating reports based on templates, the controller further being capable of creating templates,
    wherein
        each template is associated with at least one filtering criterion, selected by a user, for selecting a plurality of information access requests from the storage unit according to the at least one filtering criterion,
        the templates are available for use in future customer reports,
        filtering criteria for each template can be adjusted by the user before the template is used to generate a customized report, and
        the risks comprises behavior risk and performance risk, the behavior risk is assessed by comparing a detected behavior of a user against a behavior profile for the user, the user accessing an allowed information at a time that is outside of the behavior profile for the user will raise a level of the behavior risk, and the performance risk is assessed by comparing a detected transaction time for an information access against a threshold.

11. The apparatus of claim 10, wherein the controller further stores the templates in the storage unit.

12. The apparatus of claim 10, further a user interface unit for presenting the risks to a system administrator and for receiving the at least one filtering criterion.

13. The apparatus of claim 10, wherein the controller further being capable of calculating a total risk for each information access request to the database.

14. A method for presenting a predefined report related to risk associated with information access requests in a system comprising the steps of:
    receiving a plurality of information access requests to a database from an access request monitoring unit;

storing the plurality of information access requests in a storage unit;

associating each information access request with risks calculated according to a plurality of risk policies retrieved from a policy storage unit;

receiving, from a user interface, a report selected from a plurality of templates;

adjusting filtering criteria associated with the selected report;

retrieving information access requests from the storage unit according to the adjusted filtering criteria; and presenting a report according to the selected report with the adjusted filtering criteria along with the retrieved information access requests, wherein the risks comprise behavior risk and performance risk, the behavior risk is assessed by comparing a detected behavior of a user against a behavior profile for the user, the user accessing an allowed information at a time that is outside of the behavior profile for the user will raise a level of the behavior risk, and the performance risk is assessed by comparing a detected transaction time for an information access against a threshold.

15. The method of claim 14, further comprising the steps of:

creating a new template with the adjusted filtering criteria for re-creating the report done previously; and storing the new template in a storage unit.

16. The method of claim 14, further comprising the step of, if the risk is above a threshold, issuing a alert.

* * * * *